US012407124B1

(12) United States Patent
Samaniego et al.

(10) Patent No.: US 12,407,124 B1
(45) Date of Patent: Sep. 2, 2025

(54) CONNECTOR DISENGAGE RESISTANCE MECHANISM

(71) Applicant: HARTING Electric Stiftung & Co. KG, Espelkamp (DE)

(72) Inventors: Juan Samaniego, Elgin, IL (US); Julie Rutter, Elgin, IL (US); Karol Goszczynski, Big Rock, IL (US); Jan Andree Beneke, Vechta (DE); Casey Spitz, Arlington Heights, IL (US)

(73) Assignee: HARTIN Electric Stiftung & Co. KG, Espelkamp (DE)

( * ) Notice: Subject to any disclaimer, the term of this patent is extended or adjusted under 35 U.S.C. 154(b) by 0 days.

(21) Appl. No.: 19/206,136

(22) Filed: May 13, 2025

Related U.S. Application Data

(63) Continuation of application No. PCT/IB2024/051591, filed on Feb. 20, 2024.

(60) Provisional application No. 63/446,962, filed on Feb. 20, 2023.

(51) Int. Cl.
*H01R 13/05* (2006.01)
*H01R 13/627* (2006.01)

(52) U.S. Cl.
CPC ....... *H01R 13/052* (2013.01); *H01R 13/6278* (2013.01)

(58) Field of Classification Search
CPC .... H01R 13/443; H01R 13/64; H01R 13/629; H01R 13/052
USPC ......................................... 439/379, 380, 148
See application file for complete search history.

(56) References Cited

U.S. PATENT DOCUMENTS 3,004,170 A * 10/1961 Greenspan .............. B60R 25/04 439/43
4,493,520 A 1/1985 Davies
4,545,632 A * 10/1985 Maier .................... H01R 25/00 439/43
4,597,620 A 7/1986 Lindner et al.
(Continued)

FOREIGN PATENT DOCUMENTS

CN 201629434 U 11/2010
CN 102306879 A 1/2012
(Continued)

OTHER PUBLICATIONS

Phoenix Contact GmbH & Co. KG, Cancellation proceedings against German utility model 20 2023 002 957, filed Jul. 2, 2025 in the German Patent and Trade Mark Office.
(Continued)

*Primary Examiner* — Marcus E Harcum
(74) *Attorney, Agent, or Firm* — Smartpat PLC

(57) ABSTRACT

A plug connector includes a housing having a cable opening for receiving a cable with a plurality of wires. A plurality of contacts are arranged within a contact insert. A retention pin is arranged within the contact insert, the retention pin having a base and a protruding portion. The protruding portion of the retention pin is configured to engage a socket insert of a socket connector through a socket contact opening when the plug connector is plugged into the socket connector. A diameter of the protruding portion of the retention pin exceeds a diameter of the socket contact opening. The retention pin resiliently deforms during unplugging the plug connector and thereby increases its withdrawal force.

19 Claims, 10 Drawing Sheets

(56) References Cited

U.S. PATENT DOCUMENTS

| | | | | | |
|---|---|---|---|---|---|
| 4,707,043 | A * | 11/1987 | Reed | H01R 13/443 439/282 |
| 5,176,533 | A | 1/1993 | Sakurai et al. | |
| 5,338,213 | A * | 8/1994 | Oko | H01R 13/443 174/138 F |
| 5,658,162 | A | 8/1997 | Harting et al. | |
| 5,997,320 | A * | 12/1999 | DeMello | H01R 13/443 439/35 |
| 6,247,965 | B1 * | 6/2001 | Cummings | H01R 13/443 439/744 |
| 6,273,729 | B1 * | 8/2001 | Kelly | B60R 16/0207 439/36 |
| 6,390,848 | B1 * | 5/2002 | Murakami | H01R 13/5205 439/587 |
| 6,398,579 | B1 | 6/2002 | Banas et al. | |
| 7,354,284 | B2 * | 4/2008 | Aime | H01R 13/443 439/148 |
| 7,481,675 | B2 * | 1/2009 | Patterson | H01R 13/5205 439/507 |
| 7,651,376 | B2 | 1/2010 | Schreier | |
| 7,785,131 | B2 | 8/2010 | Ferderer et al. | |
| 7,938,674 | B2 | 5/2011 | Lindkamp et al. | |
| 8,169,113 | B2 * | 5/2012 | Jia | H02K 5/225 310/71 |
| 8,292,676 | B2 | 10/2012 | Schmidt et al. | |
| 8,662,921 | B2 * | 3/2014 | Kataoka | H01R 13/443 439/587 |
| 8,668,530 | B2 | 3/2014 | Riepe et al. | |
| 8,900,018 | B2 | 12/2014 | Riepe et al. | |
| 8,915,749 | B2 | 12/2014 | Ikeda et al. | |
| 8,979,568 | B2 | 3/2015 | Herbrechtsmeier et al. | |
| 8,992,266 | B2 | 3/2015 | Schmidt et al. | |
| 9,608,374 | B2 | 3/2017 | Beischer et al. | |
| 9,692,161 | B2 | 6/2017 | Lindkamp et al. | |
| 9,799,984 | B2 * | 10/2017 | Lueckemeier | H01R 13/5213 |
| 9,847,608 | B2 | 12/2017 | Bruex et al. | |
| 9,923,307 | B2 | 3/2018 | Beischer et al. | |
| 10,283,900 | B2 | 5/2019 | Herbrechtsmeier et al. | |
| 10,418,773 | B2 | 9/2019 | Herbrechtsmeier | |
| 11,223,155 | B1 * | 1/2022 | Marquez | H01R 13/443 |
| 11,387,591 | B2 | 7/2022 | Lötkemann et al. | |
| 2002/0049005 | A1 * | 4/2002 | Leve | H01R 13/17 439/825 |
| 2005/0146855 | A1 * | 7/2005 | Brehm | H05K 7/1454 361/788 |
| 2007/0155252 | A1 | 7/2007 | Ferderer | |
| 2008/0305664 | A1 * | 12/2008 | Shishikura | H01R 13/5213 439/148 |
| 2010/0120276 | A1 * | 5/2010 | White | H02G 3/14 439/373 |
| 2016/0093980 | A1 | 3/2016 | Beischer et al. | |
| 2021/0119372 | A1 | 4/2021 | Stremlau et al. | |
| 2021/0194167 | A1 | 6/2021 | Thomas et al. | |
| 2021/0408739 | A1 * | 12/2021 | Ivancic | H01R 13/622 |
| 2022/0360008 | A1 | 11/2022 | Aboulkassem et al. | |
| 2023/0076634 | A1 * | 3/2023 | Ni | H01R 12/51 |

FOREIGN PATENT DOCUMENTS

| | | | | |
|---|---|---|---|---|
| CN | 102437453 A | 5/2012 | |
| DE | 1465689 A1 | 5/1969 | |
| DE | 2855867 A | 7/1980 | |
| DE | 2855867 A1 * | 7/1980 | |
| DE | 3602296 A1 | 7/1987 | |
| DE | 9400329 U1 | 4/1994 | |
| DE | 4400478 C1 | 5/1995 | |
| DE | 102017104123 | 4/2018 | |
| DE | 112018006768 T5 | 9/2020 | |
| DE | 102019111847 A1 | 11/2020 | |
| DE | 102019121975 A1 | 2/2021 | |
| DE | 202023002957 U1 | 3/2025 | |
| EP | 3211727 A1 | 8/2017 | |
| KR | 20210096006 A * | 8/2021 | H01R 43/20 |
| WO | WO-9629761 A1 * | 9/1996 | H01R 13/44 |
| WO | 2024156304 A1 | 8/2024 | |

OTHER PUBLICATIONS

UL 1682 „"Standard for Safety—Plugs, Receptacles, and Cable Connectors of the Pin and Sleeve Type", Feb. 15, 2017.

* cited by examiner

CONNECTOR DISENGAGE RESISTANCE MECHANISM

CROSS-REFERENCE TO RELATED APPLICATION

This application is a continuation of international patent application PCT/IB2024/051591, filed 20 Feb. 2024, which claims priority to U.S. provisional patent application 63/446,962, filed 20 Feb. 2023. The contents of applications PCT/IB2024/051591 and 63/446,962 is incorporated by reference in their entireties.

TECHNICAL FIELD

The present disclosure relates to electrical connectors and more specifically to plug connectors having a mechanism to increase disengagement resistance.

BACKGROUND

Plug and socket connectors are usually made up of a male plug and a female socket. The plug typically includes pin contacts, and the socket typically includes receptacle contacts. Sockets are often permanently fixed to a device as in a chassis connector, and plugs are attached to a cable. Plugs and sockets may both be connected to cables, for example to connect two cables to one another.

Plugs generally have one or more metal contacts, also referred to as terminals, which are inserted into openings in the mating socket. The connection between the mating metal parts must be sufficiently tight to make a good electrical connection and complete a circuit.

A locking mechanism may be used to mechanically lock a plug to a socket. The locking mechanism can be opened to disengage the plug from the socket. Technical standards such as UL 1682 require that a minimum withdrawal force must be sufficient to prevent unintentional withdrawal of the plug from the socket during normal use even when the locking mechanism is disengaged. The withdrawal force is usually determined by the friction of mating contacts.

SUMMARY

In some aspects, the techniques described herein relate to a plug connector. The plug connector includes a housing having a cable opening for receiving a cable with a plurality of wires. A plurality of contacts are arranged within a contact insert. A retention pin is arranged within the contact insert. The retention pin has a base and a protruding portion. The protruding portion of the retention pin is configured to engage a socket insert of a socket connector through a socket contact opening when the plug connector is plugged into the socket connector. A diameter of the protruding portion of the retention pin exceeds a diameter of the socket contact opening. The retention pin is configured to resiliently deform when the plug connector is plugged into or removed from the socket connector. Thereby, the retention pin causes a retention force when the plug connector is removed from the socket connector. This can prevent an undesirable release of the plug connector from the socket connector that might otherwise occur. The retention pin can take the place of a contact and so allow retrofitting existing connectors with increased retention force without requiring further mechanical modifications.

The retention pin may include a chamfered flange. The protruding portion of the retention pin may include a bulged portion arranged proximal to a tip of the retention pin and a generally cylindrical portion arranged between the bulged portion and the base. A slot may extend across the retention pin in the bulged portion. A length of the slot may be between 40% and 60% of a length of the retention pin for a first type of retention pin and between 60% and 85% of the length of the retention pin for a second type of retention pin. The geometry of the bulged portion and the slot cooperate to achieve a desirable force-travel relationship as the retention pin slides into or out of the socket connector. The force-travel relationship can be selected such that the plug connector overall meets a specified minimum disengagement force-travel requirement.

The bulged portion of the retention pin may include circumferentially spaced bulges that are arranged on opposite sides of the slot. Each of the circumferentially spaced bulges may include a forward sloped portion extending from a front end of the bulge proximal to the tip of the retention pin to a maximum diameter area of the bulge. A rearward sloped portion may extend from the maximum diameter area of the bulge towards a rear end of the bulge proximal to the generally cylindrical portion. In some configurations, the forward sloped portion is longer than the rearward sloped portion. In other configurations, the forward sloped portion and the rearward sloped portion have a symmetrical profile.

In some configurations, the bulges have a generally triangular profile. In other configurations, the bulges have a generally arched profile. In yet another configuration a central bore may extend along a longitudinal axis through the retention pin.

The retention pin may be arranged within the contact insert in a space that is configured to accommodate one of the plurality of contacts. The retention pin is not electrically connected to any wire.

In some aspects, the techniques described herein relate to a method for assembling a plug connector. The method includes guiding a cable through a cable opening of a plug connector housing; connecting contacts to wires of the cable; inserting the contacts into a contact insert; inserting a retention pin into the contact insert; and securing the contact insert in the plug connector housing.

The method may further include selecting the retention pin from a plurality of different retention pins to selectively increase a withdrawal force required to unplug the plug connector from a socket connector. When plugging the plug connector into the socket connector the method includes resiliently deforming the retention pin while pushing the retention pin through an opening of a socket contact insert of the socket connector.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
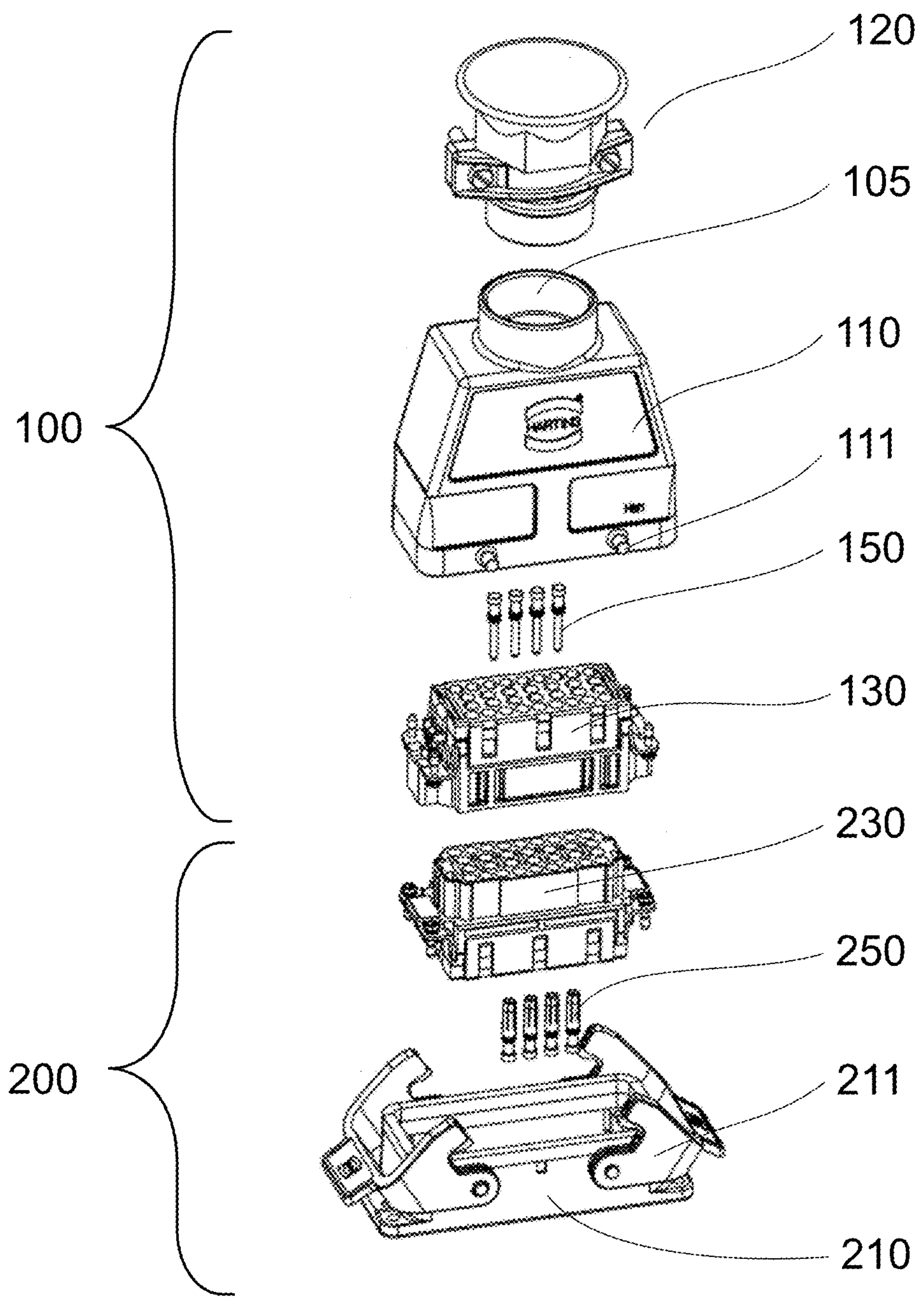
FIG. 1 shows an exploded view of a plug and socket connection system.

FIG. 1 shows an exploded view of a plug and socket connection system. The system includes a plug connector 100 and a socket connector 200.

The plug connector 100 includes a plurality of pin contacts 150. Pin contacts are sometimes referred to as male contacts. In the context of the present application, they should be more broadly understood to refer to a first type of contacts. When in use, each of the pin contacts 150 is electrically connected to one wire of a cable. Contacts may be in the form of screw terminals, crimp terminals, or cage-clamp terminals. The terms contact and terminal are used interchangeably. The pin contacts 150 are securely held within a plug insert 130. The plug insert 130 is in turn secured within a plug housing 110. The plug housing 110 may also be referred to as a hood. The plug housing 110 includes a cable entry opening 105, which can be arranged for rear entry or side entry of the cable. A cable entry protection 120 may be secured to the cable entry opening 105. The cable entry protection 120 can come in various configurations. The cable entry protection 120 can for example be a universal cable gland, a special cable clamp with strain relief, a bell mouthed cable fitting, or an anti-twist device. A cable gland may include one or multiple seals.

The plug connector 100 is configured to mate with a corresponding socket connector 200. The socket connector 200 includes a plurality of receptacle contacts 250. Receptacle contacts are sometimes referred to as female contacts. In the context of the present application, they should be more broadly understood to refer to a second type of contacts. Each of the receptacle contacts 250 is configured to receive one of the pin contacts 150 to create an electrical connection. The receptacle contacts 250 are securely held within a socket insert 230. The socket insert 230 is secured within a socket housing 210.

The geometries of the plug insert 130 and the socket insert 230 are coordinated such that they can be plugged together. When being plugged together, portions of the plug insert 130 and the socket insert 230 overlap.

A locking mechanism may be provided to lock the plug connector 100 to the socket connector 200. The locking mechanism may include a lever 211 that is pivotally connected to the socket housing 210. The lever 211 may include a recess that engages a locking protrusion 111 of the plug housing 110. When engaged, the lever securely holds the plug connector 100 and the socket connector 200 together. The lever 211 can be pivoted into an unlocked position to disengage the locking protrusion 111 for removing the plug connector 100 from the socket connector 200.

Figure 2:
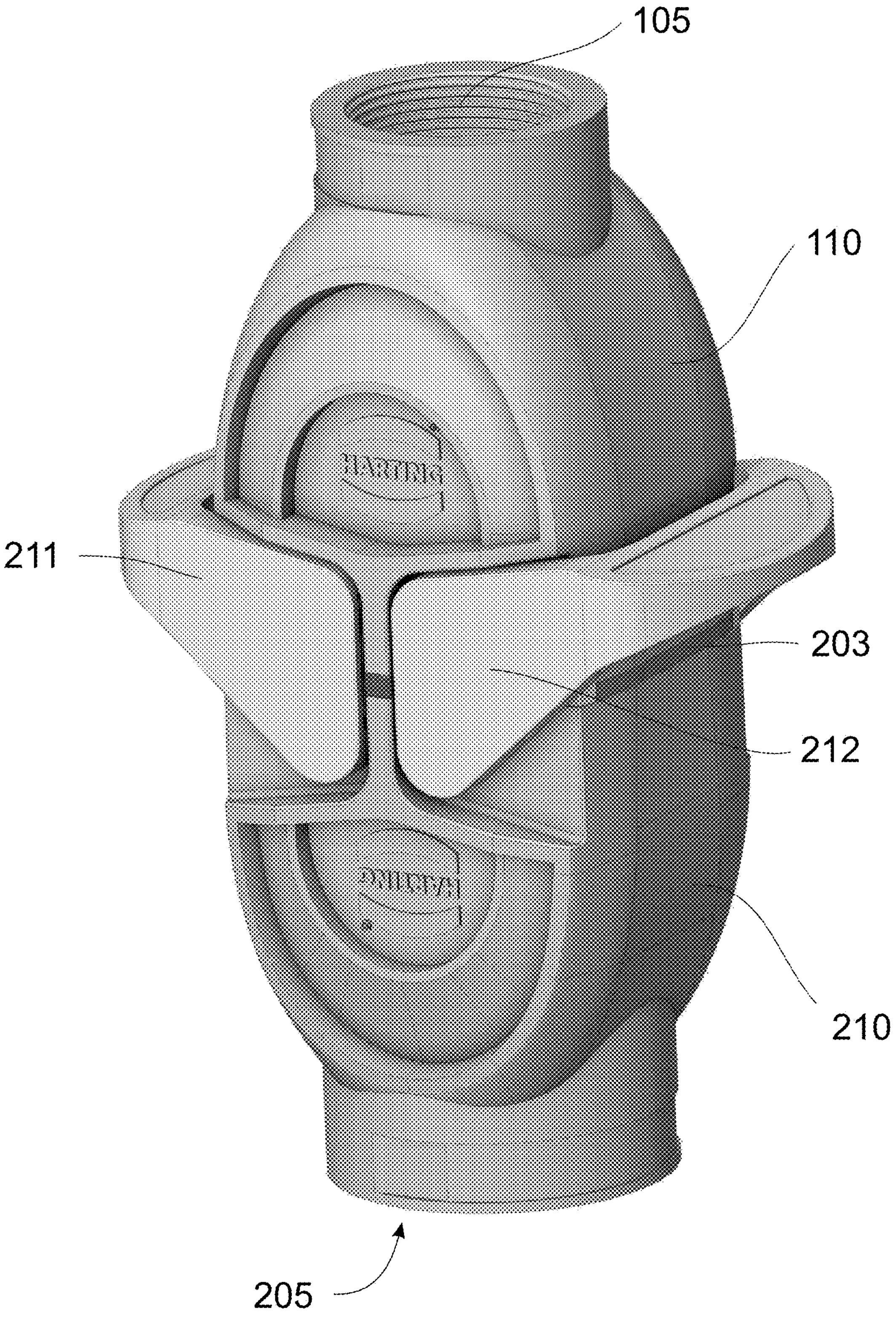
FIG. 2 is a perspective view of a plug and socket connection system.

FIG. 1 illustrates an example in which the socket connector 200 is suitable to be permanently fixed to a device as in a chassis connector. FIG. 2 shows an alternative configuration in which the plug housing 110 and the socket housing 210 are alike and both are configured to be connected to a respective cable. Both the plug housing 110 and the socket housing 210 include respective cable entry openings 105, 205. The plug housing 110 is locked to the socket housing 210 by a locking mechanism. The locking mechanism here includes two levers 211, 212. The levers 211, 212 are shown in the locked state. To unlock the plug housing 110 from the socket housing 210 the levers can be pivoted towards the socket connector 200. A seal 203 is arranged between the plug housing 110 and the socket housing 210.

Once the locking mechanism has been unlocked, the plug connector 100 and the socket connector 200 can be disconnected by applying an axial withdrawal force. The amount of withdrawal force required to separate the plug connector 100 from the socket connector 200 depends primarily on the number of and friction between the pin contacts 150 and receptacle contacts 250 within the connectors. The withdrawal force can additionally depend on a friction force between the plug insert 130 and the socket insert 230, if those are designed with interference fit.

In some applications, the withdrawal force required to remove the plug connector 100 from the socket connector 200 may be less than a desired retention force of the plug connector. That is, the plug connector 100 can be removed from the socket connector 200 by pulling the plug connector 100 with a withdrawal force that is less than the desired retention force. This is particularly troubling if the withdrawal force is less than a retention force mandated by standards, such as UL 1682.

The UL 1682 standard requires a minimum retention force of 67 N for connectors having a 60 A rating. Therefore, a withdrawal force of at least 67 N but no more than 111 N may be desired. Yet, the withdrawal force caused by existing friction between the contacts 150, 250 and possibly the contact inserts 130, 230 may be less than the desired minimum of 67 N. In that case, a retention pin 160 may be inserted into an otherwise unused contact cavity 131 of the plug insert 130.

Figure 3:
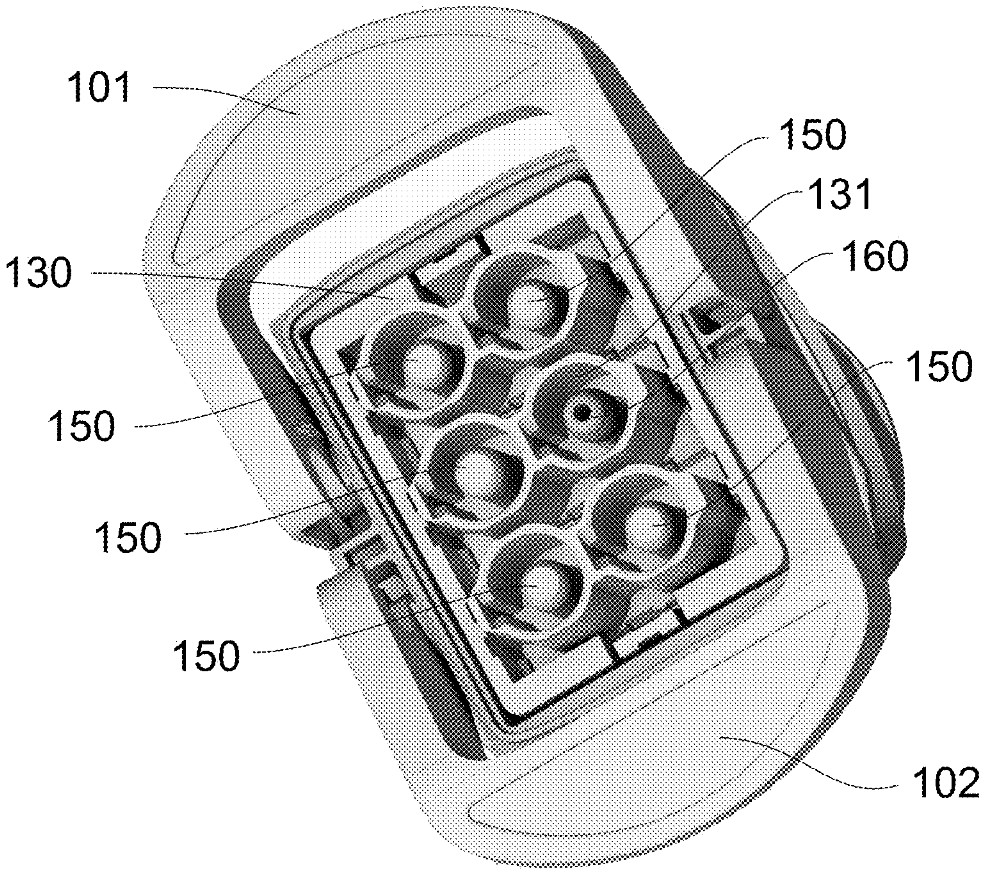
FIG. 3 is a perspective view into a plug connector.

FIG. 3 is a perspective view into a plug connector 100 from a plug-in side. Arranged within the plug connector 100 is a plug insert 130. The plug insert 130 includes six identical contact cavities 131 arranged in a 2×3 matrix. The plug insert 130 is designed in modular fashion using three pairs of identical insertion modules 132, each having two contact cavities 131. The plug insert 130 is populated with five pin contacts 150. A retention pin 160 is arranged in a contact cavity 131 of the middle one of the insertion modules 132.

Figure 4:
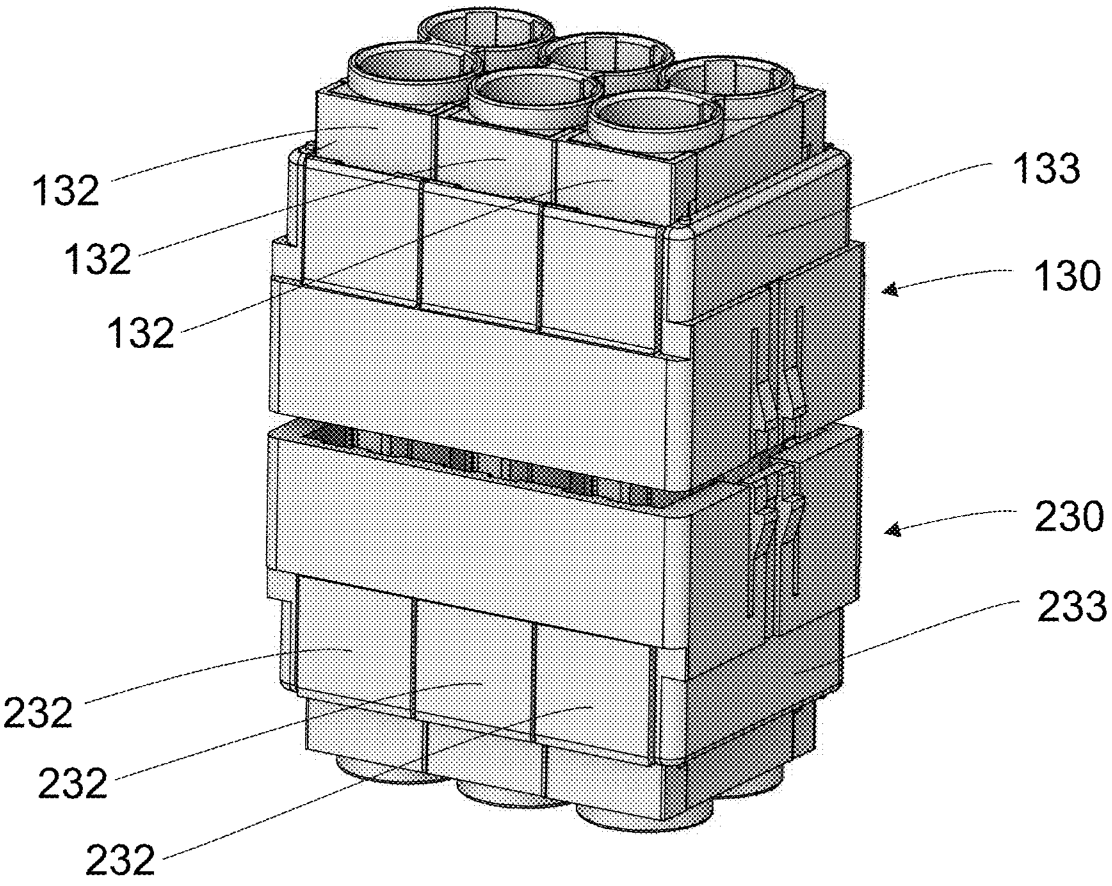
FIG. 4 shows the connection system of FIG. 2 without connector housings.

FIG. 4 shows the connection system of FIG. 2 without the connector housings 110, 210. The plug insert 130 includes an insert frame 133 into which three identical plug insertion modules 132 have been mounted. Similarly, the socket insert 230 includes an insert frame 233 into which three socket insert modules 232 have been mounted. The insert frame 133 of the plug connector 100 and the insert frame 233 of the socket connector 200 may be identical. On the other hand, the plug insertion modules 132 of the plug connector 100 and the socket insertion modules 232 of the socket connector 200 are complementary and configured to be plugged together. When plugged together, portions of the plug insertion modules 132 overlap portions of the socket insertion modules 232.

Figure 5:
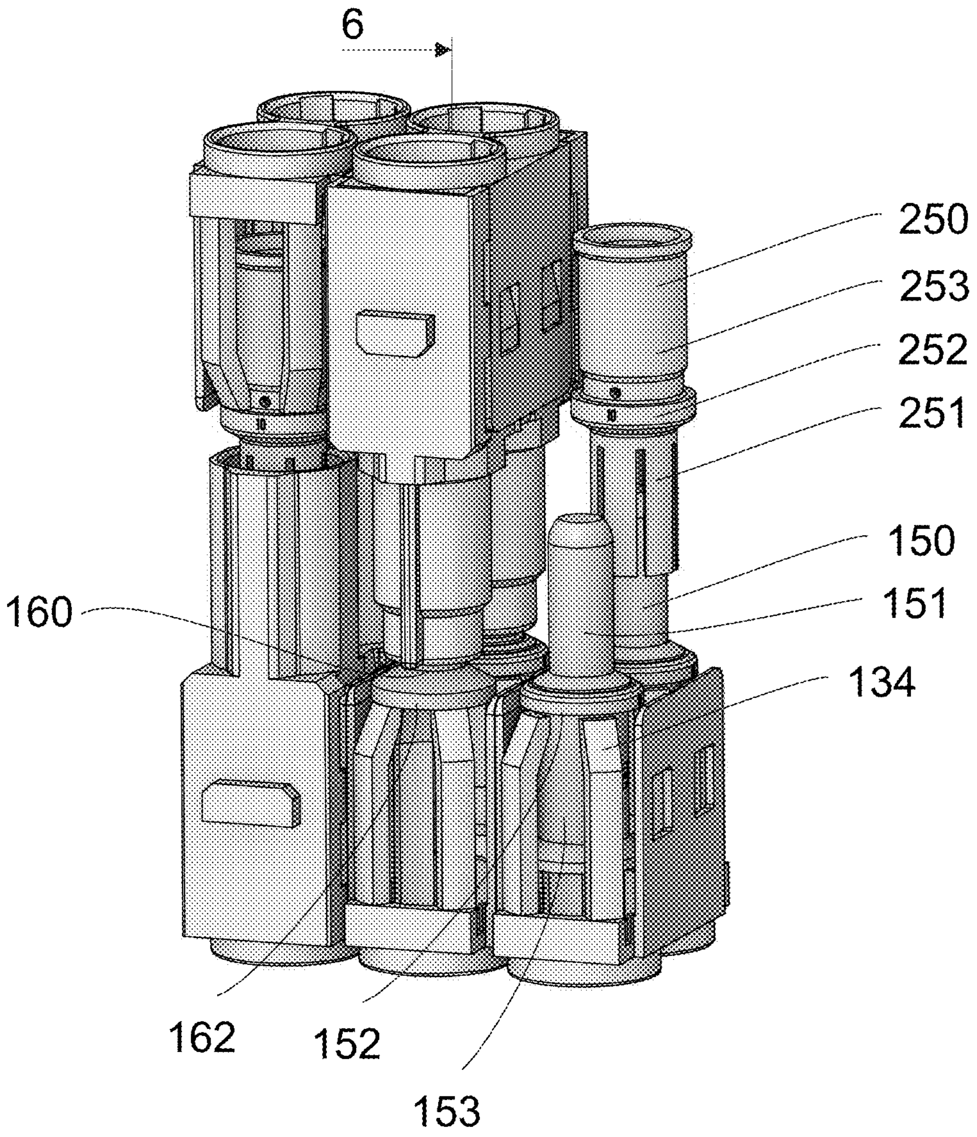
FIG. 5 provides an inside view into the assembly of FIG. 4.

FIG. 5 shows the assembly of FIG. 4 with further parts removed to reveal the inside of the connection system. In the illustrated plugged-in state, the pin contacts 150 are received in the receptacle contacts 250. Each contact includes a mating portion 151, 251 and, opposite thereto, a connecting portion 153, 253. The mating portions 251 of the receptacle contacts 250 are configured to receive the mating portions 151 of the pin contacts 150. The respective connecting portions 153, 253 are generally hollow cylindrical and configured to receive a wire. A wire may be connected to the contact 150, 250 by crimping.

A contact flange 152, 252 is in each case arranged between the mating portion 151, 251 and the connecting portion 153, 253 of the respective contact. The insertion modules 132 include resilient locking arms 134 that engage behind the contact flange 152, 252 and hold the contact in place. In particular, the resilient locking arms 134 prevent the contacts 150, 250 from being pushed out of the plug insert 130, 230 opposite to the plug-in direction.

The retention pin 160 is seated in a contact cavity that is identical to those occupied by pin contacts 150. Like the pin contacts 150, the retention pin 160 includes a flange 162. Unlike the pin contacts 150, the retention pin 160 does not have a connection portion 153. That is, because the retention pin 160 is not connected to any wire. The flange 162 forms a rear end of the retention pin 160.

Figure 6:
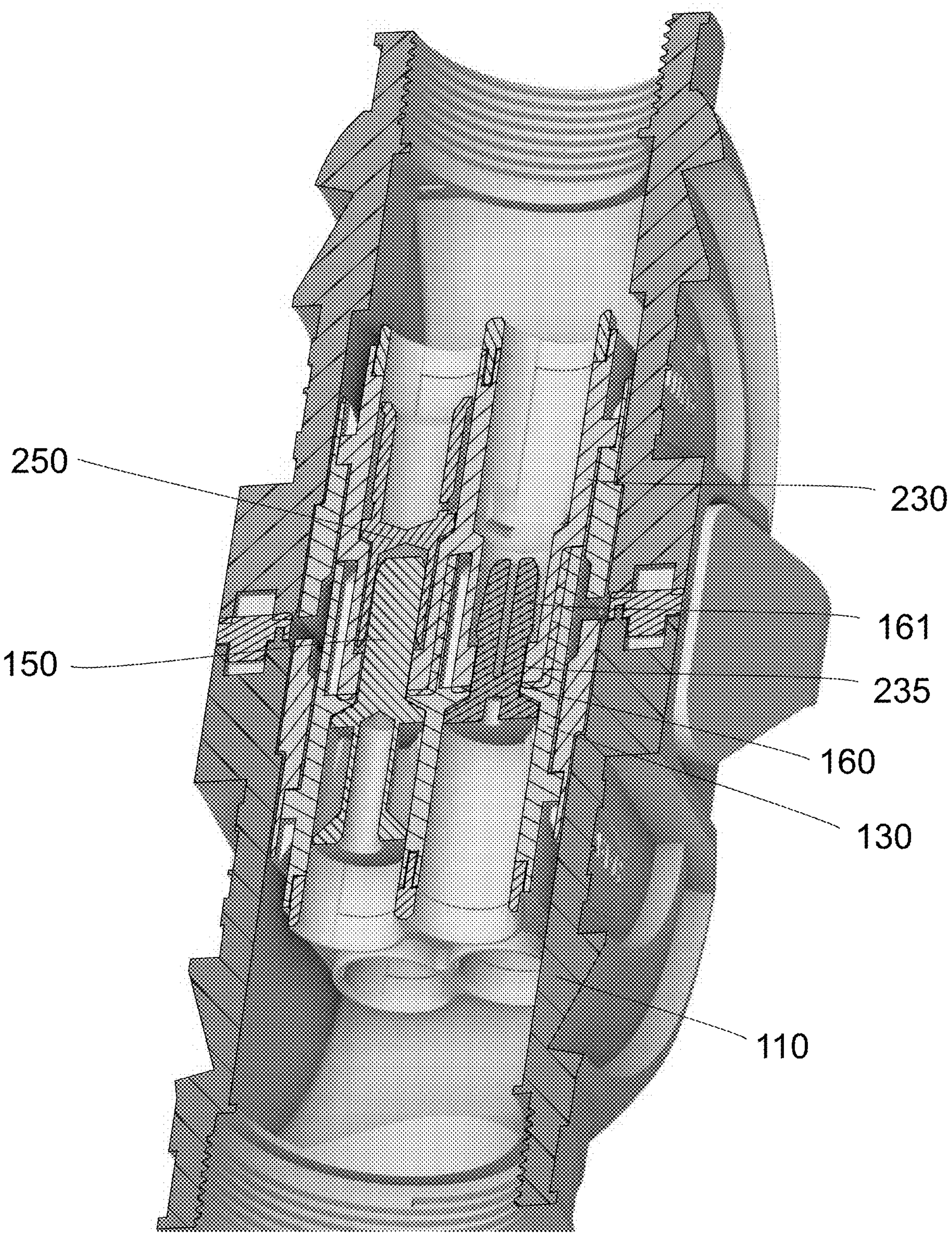
FIG. 6 shows a perspective cross-sectional view through the connection system of FIG. 2.

FIG. 6 shows a perspective cross-sectional view through the connection system of FIG. 2 as indicated by arrow 6 in FIG. 5. The cross section shows the retention pin 160 seated within the plug insert 130. A protruding portion 161 of the retention pin 160 extends through a socket contact opening 235 into the socket insert 230. In the plugged-in state the protruding portion 161 of the retention pin 160 is arranged in an overlap area of the plug insert 130 and the socket insert 230.

A diameter of the protruding portion 161 of the retention pin 160 exceeds a diameter of the socket contact opening 235. The retention pin 160 resiliently deforms when the plug connector 100 is plugged into or removed from the socket connector 200. The retention pin 160 so creates an additional retention force against which the plug connector 100 must be separated from the socket connector 200.

The additional retention force provided by the retention pin 160 depends on its geometry as well as the material of which it is made. It is therefore possible to tune the retention force of the overall connector system by selecting one of multiple differently designed retention pins 160.

FIGS. 7-15 illustrate three such differently designed retention pins 160, 180, 190 that generate different retention forces. The retention pins 160 include a protruding portion 161 and a base 163. The protruding portion 161 engages the socket insert 230 of the socket connector 200. The base 163 is securely held within the plug insert 130 by its chamfered flange 162.

Figure 7:
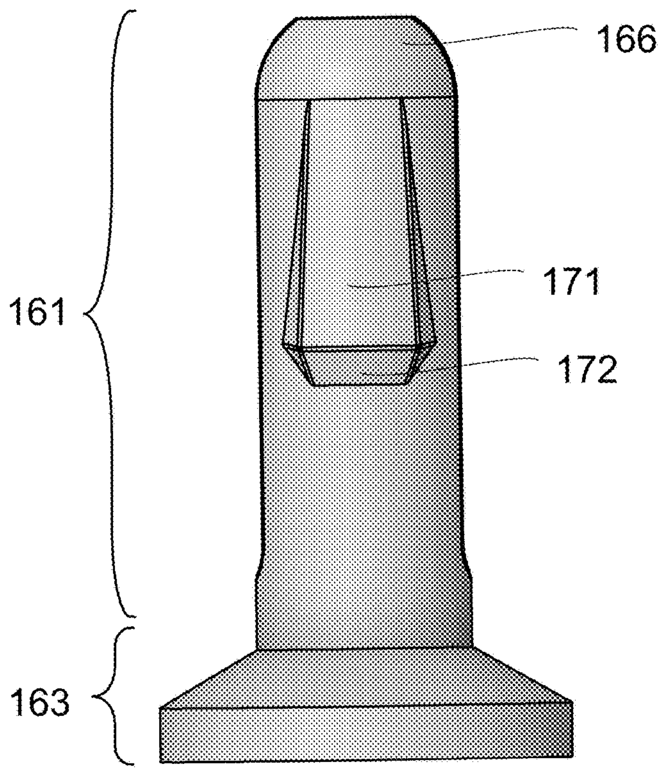
FIG. 7 is a side view of a first configuration of a retention pin.
Figure 8:
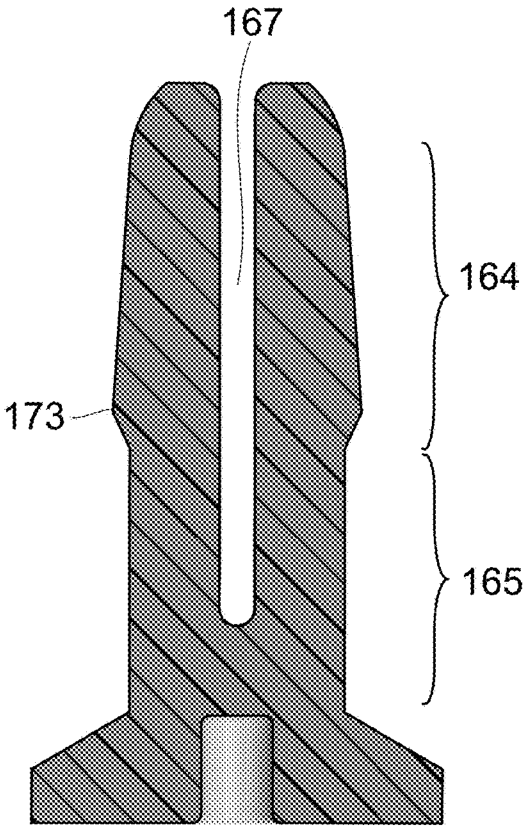
FIG. 8 is a cross sectional view of the retention pin of FIG. 7.
Figure 9:
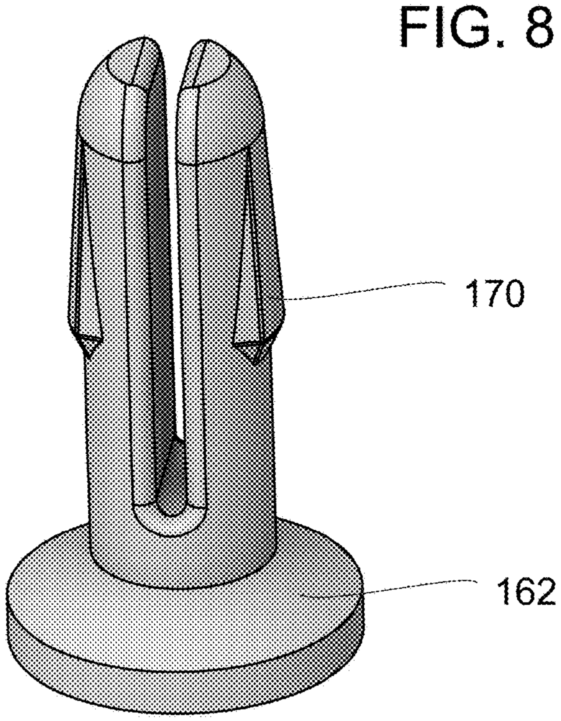
FIG. 9 is a perspective view of the retention pin of FIG. 7.
Figure 10:
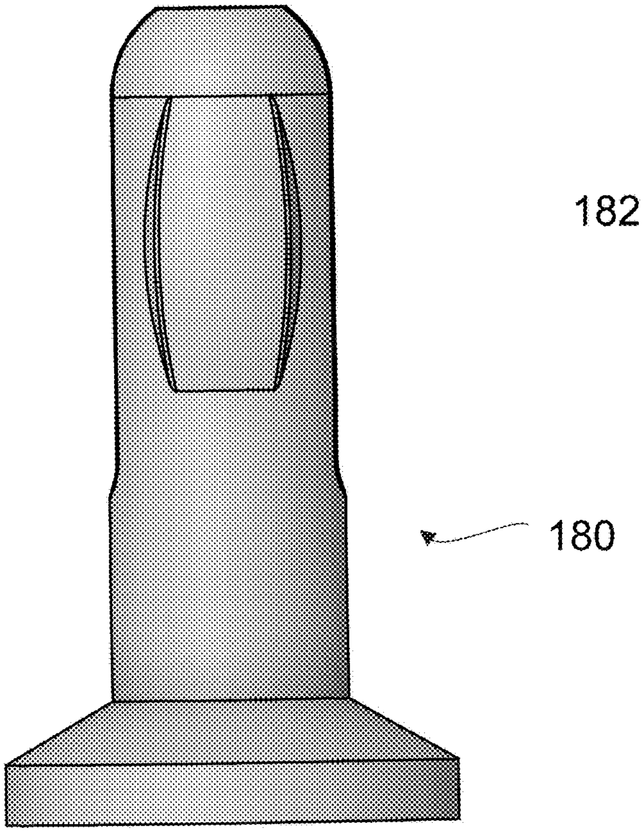
FIG. 10 is a side view of a second configuration of a retention pin.
Figure 11:
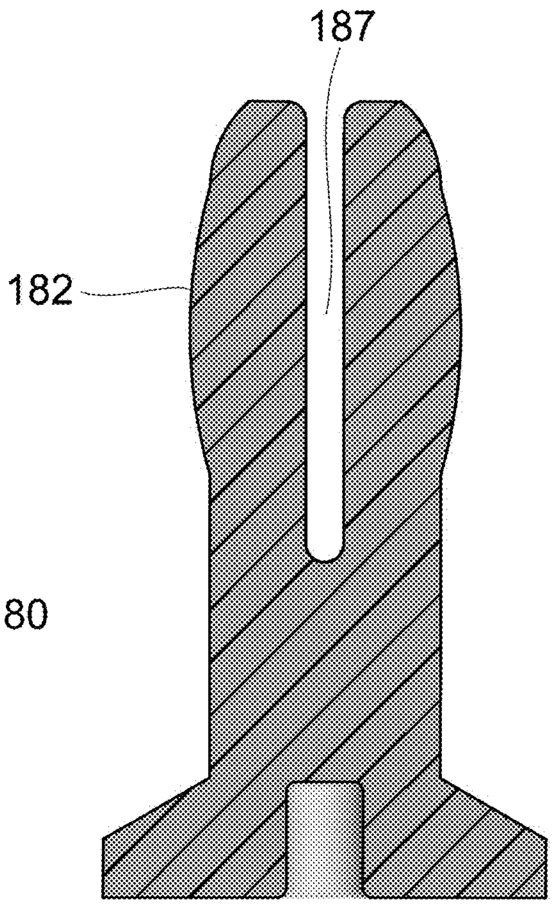
FIG. 11 is a cross sectional view of the retention pin of FIG. 10.
Figure 12:
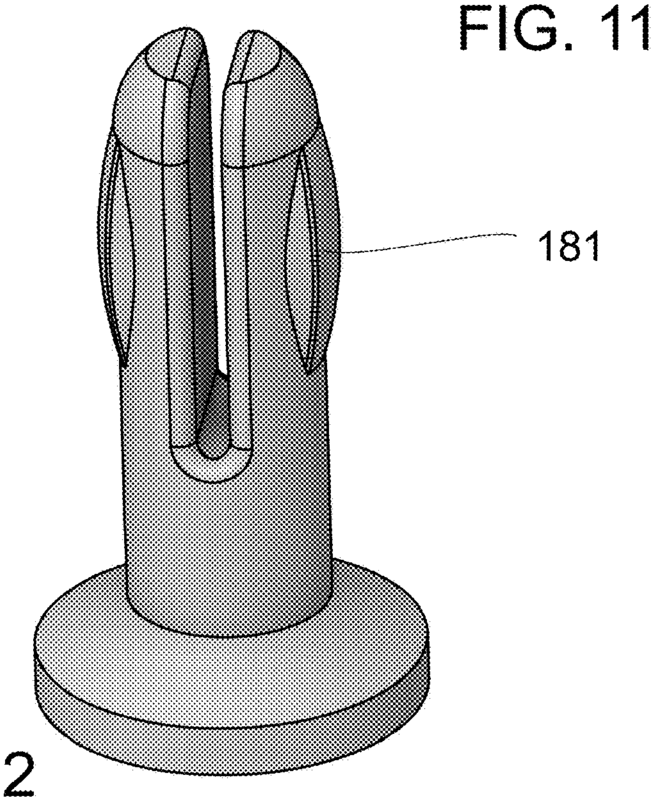
FIG. 12 is a perspective view of the retention pin of FIG. 10.

The design shown in FIGS. 7-9 shows the protruding portion 161 having a bulged portion 164 arranged proximal to a tip 166 of the retention pin 160. A generally cylindrical portion 165 is arranged between the bulged portion 164 and the base 163. A slot 167 extends across the retention pin in the bulged portion 164 and partially into the generally cylindrical portion 165. The length of the slot 167 is directly related to the resilience of the retention pin 160 and thereby to the retention force created by the retention pin 160. FIGS. 7-9 show a configuration utilizing a long slot 167 having a length that is between 60% and 85% of a total length of the retention pin 160. FIGS. 10-12 show a configuration utilizing a short slot 187 having a length that is between 40% and 60% of a total length of the retention pin 180. The length of the slot 167, 187 can be varied to fine-tune the retention force created by the retention pin 160, 180.

The bulged portion 164 includes circumferentially spaced bulges 170. The circumferentially spaced bulges are arranged on opposite sides of the slot 167. FIGS. 7-8 show two bulges 170, but more than two bulges 170 can be used. For example, the retention pin 160 can be designed to utilize two crossing slots 167 and four bulges 170.

Each of the circumferentially spaced bulges 170 includes a forward sloped portion 171 extending from a front end of the bulge 170 proximal to the tip 166 of the retention pin 160 to a maximum diameter area 173 of the bulge 170. The width mw of the retention pin 160 at the maximum diameter area 173 is greater than the socket contact opening 235. For example, a diameter of the socket contact opening 235 may be 6.25 mm. A width mw of the retention pin 160 in the maximum diameter area 173 of the bulge 170 may be 6.9 mm. That is, the maximum diameter area 173 is about 10% wider than the socket contact opening 235. About 10% here refers to being between 5% and 15% wider.

As shown in FIGS. 7-9, the forward sloped portion 171 of the bulge 170 is longer than the rearward sloped portion 172. The asymmetry causes different force profiles and corresponding user perception when plugging the plug connector 100 into the socket connector 200 compared to unplugging the plug connector 100 from the socket connector 200. While a resisting force when plugging the plug connector 100 into the socket connector 200 builds up slowly, the withdrawal force that acts against unplugging the plug connector 100 from the socket connector 200 increases sharply with minimal travel.

The forward sloped portion 171 of the bulge 170 may be in the shape of a truncated cone sector having a cone angle between 5° and 15° and in particular about 8°. The rearward sloped portion 172 of the bulge 170 may be in the shape of a truncated cone sector with a steeper cone angle between 30° and 65° and on particular about 50°. The different cone angles can cause a total insertion force to plug the plug connector 100 into the socket connector 200 to be lower than a total withdrawal force to unplug the plug connector 100 from the socket connector 200.

FIGS. 10-12 show an alternative design in which a first sensory effect while plugging the plug connector 100 into the socket connector 200 and a second sensory effect while unplugging the plug connector 100 from the socket connector 200 are identical. This is achieved by a symmetrical arched profile 182 of the bulges 181 of the retention pin 180 as illustrated in FIG. 11. The symmetrical arched profile 182 changes the force-travel curve of the retention pin 180 compared to the triangular asymmetric profile of the bulges 170 illustrated in FIG. 8.

Figure 13:
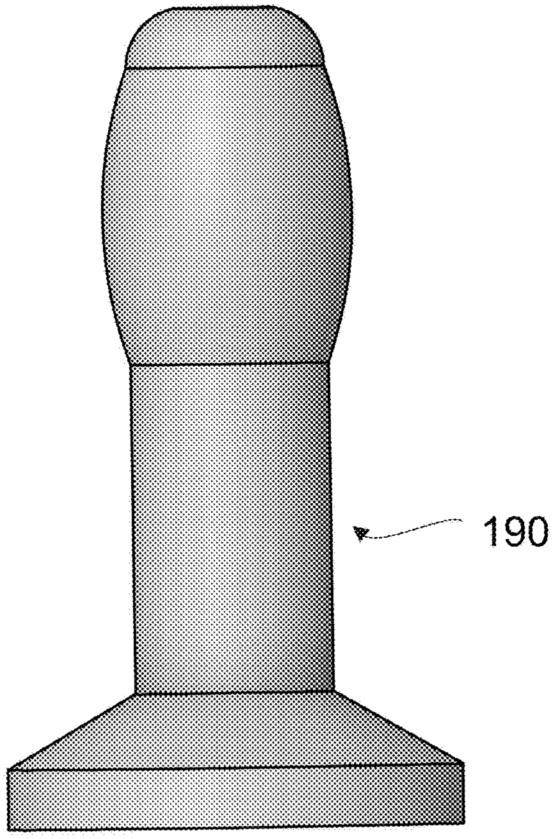
FIG. 13 is a side view of a third configuration of a retention pin.
Figure 14:
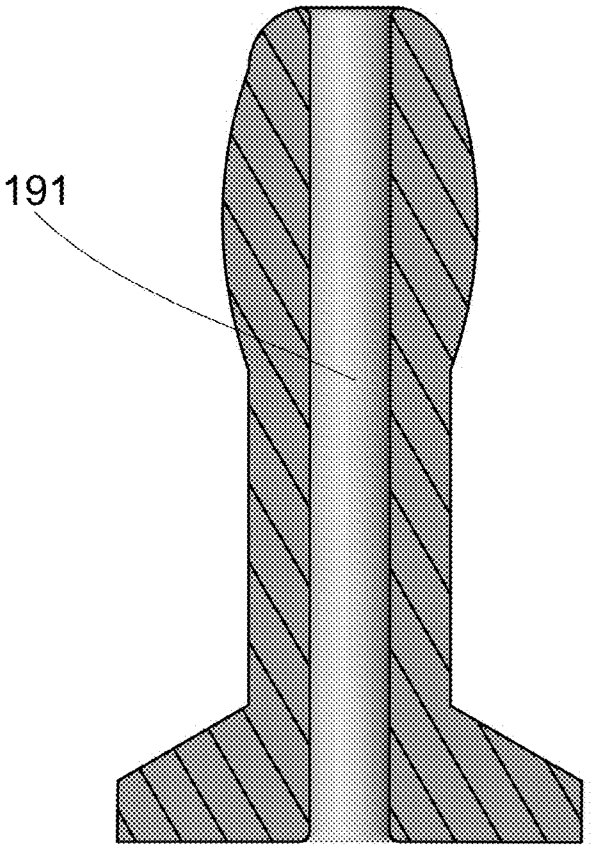
FIG. 14 is a cross sectional view of the retention pin of FIG. 13.
Figure 15:
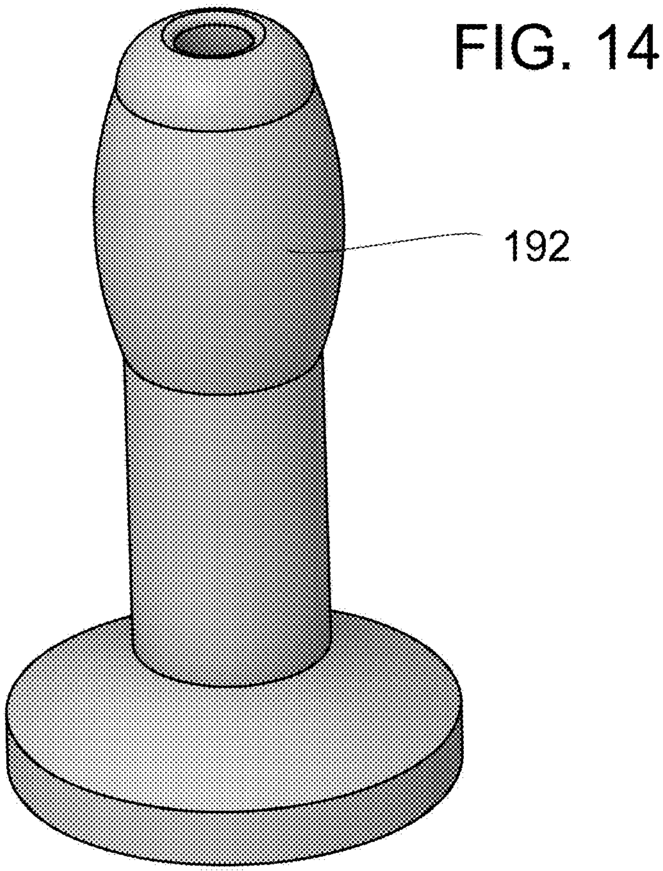
FIG. 15 is a perspective view of the retention pin of FIG. 13.

FIGS. 13-15 show yet another alternative design of a retention pin 190. The retention pin 190 is a rotationally symmetrical body and includes a central bore 191. A single bulge 192 extends all around the retention pin 190. The single bulge 192 has an arched outer profile.

While the drawings show the retention pin 160 in a plug connector 100 adjacent to pin contacts 150 it should be appreciated that the retention pin 160 can equally be used adjacent to the receptacle contacts 250 in the socket connector 200.

Figure 16:
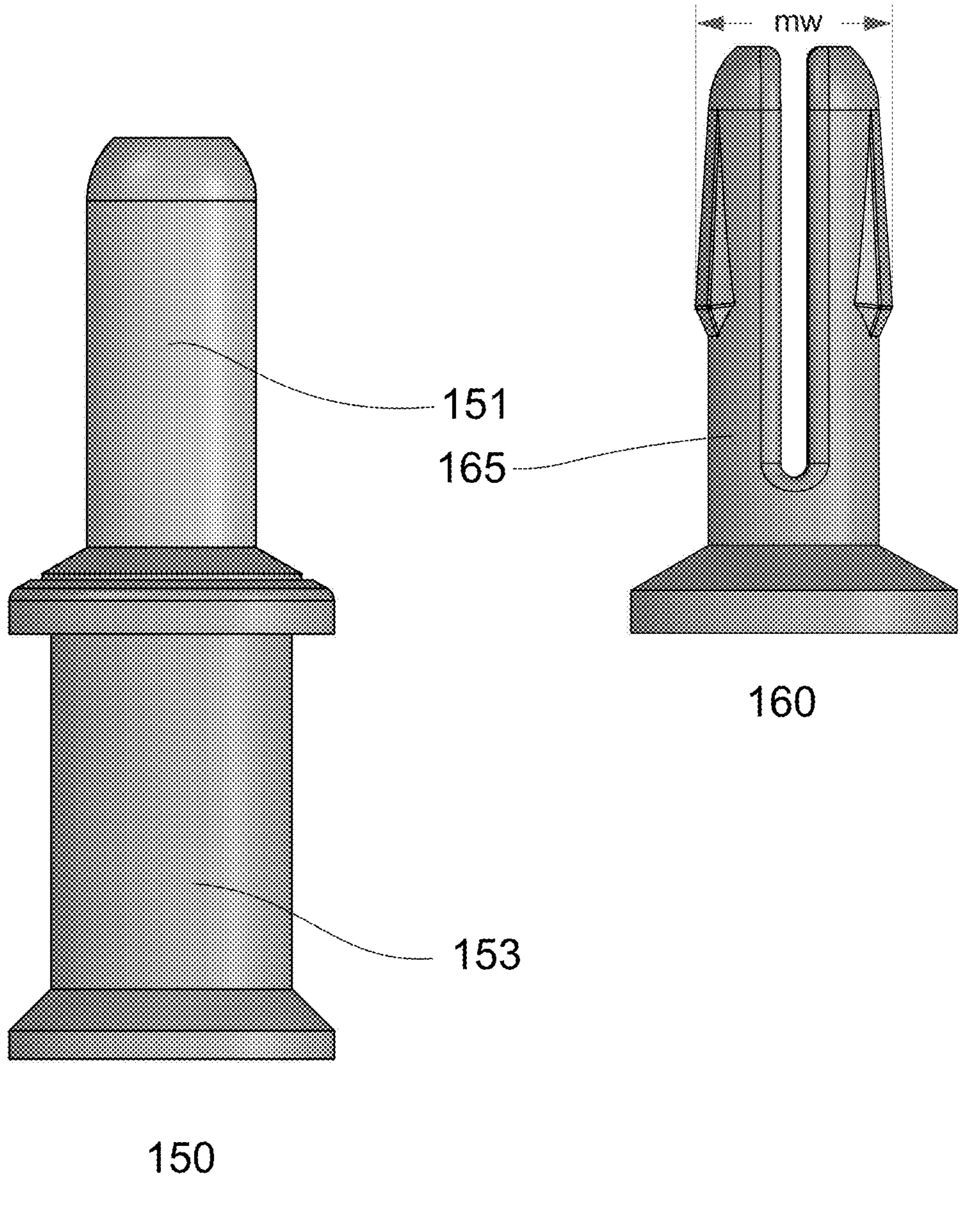
FIG. 16 shows a comparison between a pin terminal and a retention pin.

For comparison, FIG. 16 shows the retention pin 160 directly adjacent to a pin contact 150. An axial length of the retention pin 160 is clearly shorter than an axial length of the pin contacts 150. The retention pin 160 lacks a connection portion 153 for connecting a wire. This makes the retention pin 160 simpler and cheaper to manufacture than a pin contact 150. The diameter of the generally cylindrical portion 165 of the retention pin 160 corresponds to a diameter of the mating portion 151 of the pin contacts 150. The maximum width mw of the bulged portion 164 of the retention pin 160 is 10 to 20% and approximately 15% larger than the diameter of the generally cylindrical portion 165.

The retention pin 160 can be produced as a machined metal part, for example from a cylinder made of aluminum. The retention pin 160 need not be electrically conductive and can be made of plastic, for example in form of an injection-molded plastic part.

The retention pin 160 can be arranged in the same space within the plug connector 100 that could be occupied by a pin contact 150. Alternatively, the retention pin 160 can be arranged in the same space within the socket connector 200 that could be occupied by a receptacle contact 250. More than one retention pin 160 can be used in a given plug connector 100 or socket connector 200.

The use of retention pins may be particularly advantageous where an existing connection system has to meet retention force requirements to which it was not originally designed. In such instances, a retention pin can be used to retrofit the existing connector if the connector can accommodate more pins than needed in a given application. In those instances, a method for assembling a plug connector can be used. The method includes guiding a cable through a cable opening of a plug connector housing; connecting contacts to wires of the cable; inserting the contacts into a contact insert; inserting a retention pin into the contact insert; and securing the contact insert in the plug connector housing.

More than one type of retention pin can be used to tune the existing connector to a given withdrawal force. In that case the method includes selecting the retention pin from a plurality of different retention pins to selectively increase a withdrawal force required to unplug the plug connector from a socket connector.

Increase in the withdrawal force is effected by resilient deformation of the retention pin when plugging the plug connector into a socket connector. The method thus includes resiliently deforming the retention pin while pushing the retention pin through an opening of a socket contact insert of the socket connector.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements that are included within the spirit and scope of the following claims.

What is claimed is:

1. A plug connector assembly for providing increased resistance against unintended release from a socket connector, the plug connector assembly comprising a contact insert comprising a plurality of cavities, the plurality of cavities arranged in a matrix of three columns and two rows, and a retention pin having a base portion and a protruding portion, wherein the retention pin occupies a cavity in a middle column of the matrix, wherein the retention pin is not electrically conductive, and wherein the protruding portion of the retention pin is configured to engage a socket insert of the socket connector when the plug connector assembly is plugged into the socket connector.

2. The plug connector assembly as in claim 1, wherein the protruding portion of the retention pin engages the socket insert through a socket contact opening.

3. The plug connector assembly as in claim 2, wherein a diameter of the protruding portion of the retention pin exceeds a diameter of the socket contact opening.

4. The plug connector assembly as in claim 2, wherein the protruding portion of the retention pin has a maximum diameter area that is wider than the socket contact opening.

5. The plug connector assembly as in claim 4, wherein the maximum diameter area of the retention pin is between 5% and 15% wider than the socket contact opening.

6. The plug connector assembly of claim 1, further comprising a plurality of contacts arranged within the cavities not occupied by the retention pin.

7. The plug connector assembly of claim 6, wherein the plurality of contacts includes exactly five pin contacts.

8. The plug connector assembly of claim 1, wherein the retention pin is made of plastic.

9. The plug connector assembly of claim 8, wherein the retention pin is an injection-molded plastic part.

10. The plug connector assembly of claim 1, further comprising a housing for the contact insert, the housing having an opening for receiving a cable with a plurality of wires.

11. The plug connector assembly of claim 10, wherein the housing further comprises a cable entry protection.

12. The plug connector assembly of claim 11, wherein the cable entry protection is one of a universal cable gland, a special cable clamp with strain relief, a bell mouthed cable fitting, and an anti-twist device.

13. The plug connector assembly of claim 10, wherein the housing comprises a locking mechanism to lock the plug connector assembly to the socket connector.

14. The plug connector assembly of claim 13, wherein the locking mechanism comprises a plurality of locking protrusions for engaging with a lever on the socket connector.

15. The plug connector assembly of claim 6, wherein the plurality of contacts are crimp contacts.

16. The plug connector assembly of claim 6, further comprising a cable with a plurality of wires, each of the plurality of wires connected to a respective one of the plurality of contacts at a connection portion of the contact.

17. A plug connector assembly for providing increased resistance against unintended release from a socket connector, the plug connector assembly comprising:

a contact insert comprising a plurality of cavities, the plurality of cavities arranged in a matrix of three columns and two rows, and a retention pin having a base portion and a protruding portion, wherein the retention pin occupies a cavity in a middle column of the matrix, wherein the retention pin is not electrically conductive, and wherein the protruding portion of the retention pin is configured to engage a socket insert of the socket connector when the plug connector assembly is plugged into the socket connector;

a plurality of contacts, each of the plurality of contacts having a mating portion and a connection portion, wherein each of the plurality of contacts is arranged within one of the plurality of cavities not occupied by the retention pin;

a cable with a plurality of wires, each of the plurality of wires connected to a respective one of the plurality of contacts at the connection portion of the contact; and a housing for holding the contact insert, the housing having an opening for receiving the cable with the plurality of wires.

18. The plug connector assembly of claim 17, wherein the housing comprises a plurality of locking protrusions for engaging with a lever on the socket connector.

19. A plug and socket system for providing increased resistance against unintended release, the plug and socket system comprising:

a connector assembly comprising a contact insert comprising a first plurality of cavities, the first plurality of cavities arranged in a matrix of three columns and two rows, and a retention pin having a base portion and a protruding portion, wherein the retention pin occupies one of the first plurality of cavities located in a middle column of the matrix, and wherein the retention pin is not electrically conductive; and a socket assembly comprising a socket insert comprising a second plurality of cavities, the second plurality of cavities arranged in a matrix of three columns and two rows, and a socket contact opening in one of the second plurality of cavities located in the middle column of the matrix, wherein the protruding portion of the retention pin is configured to engage the socket insert through a socket contact opening, and wherein a diameter of the protruding portion of the retention pin exceeds a diameter of the socket contact opening.

* * * * *